United States Patent
Schwarzbauer et al.

(10) Patent No.: US 9,517,492 B2
(45) Date of Patent: Dec. 13, 2016

(54) DEVICE AND METHOD FOR TRANSPORTING OBJECTS

(71) Applicant: SIEMENS AKTIENGESELLSCHAFT, Munich (DE)

(72) Inventors: Michael Schwarzbauer, Constance (DE); Rainer Vogel, Constance (DE); Bertram Wanner, Meersburg (DE); Rolf Wiehler, Allensbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/767,212

(22) PCT Filed: Jan. 31, 2014

(86) PCT No.: PCT/EP2014/051894
§ 371 (c)(1),
(2) Date: Aug. 11, 2015

(87) PCT Pub. No.: WO2014/127972
PCT Pub. Date: Aug. 28, 2014

(65) Prior Publication Data
US 2016/0016204 A1 Jan. 21, 2016

(30) Foreign Application Priority Data
Feb. 22, 2013 (DE) .......................... 10 2013 202 950

(51) Int. Cl.
*B07C 5/00* (2006.01)
*B07C 5/38* (2006.01)
(Continued)

(52) U.S. Cl.
CPC . *B07C 5/38* (2013.01); *B07C 5/34* (2013.01); *B65G 37/00* (2013.01); *B65G 43/08* (2013.01);
(Continued)

(58) Field of Classification Search
CPC ............. B07C 5/34; B07C 5/38; B65G 37/00; B65G 43/08; B65G 67/08
(Continued)

(56) References Cited

U.S. PATENT DOCUMENTS 6,006,893 A 12/1999 Gilmore et al.
6,227,377 B1 * 5/2001 Bonnet .................. B65G 21/12
198/435

(Continued)

FOREIGN PATENT DOCUMENTS

AT DE 4245047 B4 * 9/2010 ........... B65G 47/086
DE 10255843 A1 6/2004
(Continued)

*Primary Examiner* — Terrell Matthews
(74) *Attorney, Agent, or Firm* — Laurence Greenberg; Werner Stemer; Ralph Locher

(57) ABSTRACT

A transporting device transports objects in a transport direction from a loading region to an unloading region. The device includes a first conveying unit and a second conveying unit which are arranged one behind the other in the transport direction. Efficient unloading of the objects from the transporting device is achieved by providing a separating device between the first and second conveying units. The separating device is configured to separate the objects into at least two object groups dependent on at least one object property.

11 Claims, 2 Drawing Sheets

(51) Int. Cl.
*B65G 67/08* (2006.01)
*B07C 5/34* (2006.01)
*B65G 37/00* (2006.01)
*B65G 43/08* (2006.01)

(52) U.S. Cl.
CPC ....... *B65G 67/08* (2013.01); *B65G 2811/0678* (2013.01)

(58) Field of Classification Search
USPC ....................................................... 209/552
See application file for complete search history.

(56) References Cited

U.S. PATENT DOCUMENTS

| | | | |
|---|---|---|---|
| 8,262,334 B2 | 9/2012 | Christensen et al. | |
| 9,038,828 B2 * | 5/2015 | Enenkel ................ | B65G 67/08 209/629 |
| 2007/0246328 A1 | 10/2007 | Reznik | |

FOREIGN PATENT DOCUMENTS

| | | | | |
|---|---|---|---|---|
| DE | EP 1666390 A1 * | 6/2006 | ......... | B65G 47/5104 |
| DE | 4245047 B4 | 9/2010 | | |
| DE | 102011080096 A1 | 1/2013 | | |
| EP | 1666390 A1 | 6/2006 | | |
| EP | 2325115 A1 | 5/2011 | | |
| JP | H07267351 A | 10/1995 | | |
| WO | 9739969 A1 | 10/1997 | | |
| WO | 9854073 A1 | 12/1998 | | |
| WO | 2006002156 A1 | 1/2006 | | |
| WO | WO 2006002156 A1 * | 1/2006 | ............ | B65G 43/10 |
| WO | 2006117003 A1 | 9/2006 | | |

* cited by examiner

DEVICE AND METHOD FOR TRANSPORTING OBJECTS

BACKGROUND OF THE INVENTION

Field of the Invention

The invention relates to a transporting device for transporting objects in a transporting direction from a loading region to an unloading region with a first and a second conveying unit which are arranged one behind the other in the transporting direction.

The invention further relates to a method for transporting objects in which the objects are conveyed in a transporting direction from a loading region into an unloading region.

Methods and devices of the above-mentioned type are known from the prior art. Thus for example WO 2006/117003 A1 and also WO 98/54073 A1 each describe loading and unloading devices for objects which are transported to an unloading region on conveyor belts disposed one behind the other. In the unloading region, the objects are subsequently unloaded from the devices manually or automatically.

The known devices and methods have the disadvantage that manual picking of the objects from the transporting device is complex and the objects must subsequently be stacked with great skill and creativity in a transport container, for example a truck, a swap container or transport unit.

BRIEF SUMMARY OF THE INVENTION

It is therefore the object the present invention to provide a transporting device and a method for transporting objects of the aforementioned type with which the stacking of the objects in the transport container can be performed more efficiently.

For the transporting device mentioned above the object is achieved in accordance with the invention by separating means disposed between the first and the second conveying unit which is embodied for separating the objects into at least two object groups as a function of at least one object property.

For the above-mentioned method the object is achieved in accordance with the invention by the objects being separated during conveyance as a function of at least one object property into at least two object groups and subsequently first of all objects of the one object group and then of the other object group being conveyed to the unloading region.

The inventive solution has the advantage that the separated object groups can be handled differently during unloading and thereby the unloading can be performed more efficiently. Thus for example the one object group can comprise only small, light objects and the other object group only large and/or heavy objects. Since these two object groups can be unloaded differently, the overall efficiency and the throughput of objects increases. Thus for example the large or heavy objects are stacked manually right at the bottom of a transport container. The small and light objects can be automatically shaken into an upper area of the transport container on the previously stacked large and heavy objects. The greater efficiency and the relief of the load on the operator thus stems from the fact that the objects provided grouped and thereby can be unloaded differently. The large, heavy objects can be stacked quickly and easily. In such cases the available space is used optimally. The unloading of the small, light objects on the other hand can be performed very well by tipping, which is not a problem with the small-light objects. Tipping out of large and/or heavy objects is not possible since damage could occur and there would also be no optimum utilization of the transport volume. Through the inventive solution a higher degree of utilization of the transport space available is achieved during unloading with at the same time less danger of injuries.

The inventive solution can be further developed by advantageous embodiments which can be freely combined with one another.

Thus in the inventive transporting device the separating means can include an input switch, which has a first position and the second position, disposed in the transporting direction beyond the first conveying unit, wherein in operation in the first position the objects are separated into the first object group and in the second position are separated into the second object group. This has the advantage that the flow of objects—i.e. the objects being conveyed after one another—are separated at the first conveying unit by the input switch into the two object groups.

Furthermore the separating means can include an output switch disposed in the transporting direction in front of the second conveying unit, which has a first position and a second position, wherein in operation in the first position the objects of the first object group and in the second position the objects of the second object group are conveyed to the second conveying unit. Thus the objects of the two object groups can both be directed to the second conveying unit through the output switch. Thus only one conveying unit is needed for both object groups for the transport to the unloading region, so that no additional costs from separate conveying units arise.

In order to buffer the objects of the different object groups, two storage regions, each assigned to an object group can be provided, into which the objects are able to be separated. The storage regions can be disposed between the input and/or the output switch, whereby the first and second position of the input and the output switch are each assigned to a storage area.

In an advantageous embodiment the storage regions can be arranged in a vertical direction above one another. This has the advantage that the transporting device takes up little space in a horizontal direction and thereby, where available space is restricted, such as in a transport container or truck for example, there is still an escape route for the operator.

To enable the objects to be well transported into the separating means, the input and/or output switches and/or the storage regions can be embodied as separate conveying units for transporting the objects in the transporting direction.

In an advantageous development the transporting device can include a control device which is embodied for controlling the conveying units and the storage means. In order to establish the object property used, the control device can include a measuring device which is embodied to establish the at least one object property, wherein the control device controls the separating means as a function of the object property.

The control device can further include a counter device which counts the number of the objects of the first and second object group in each case and the control device can control the separating means as a function of these counts.

This has the advantage that the ratio of objects of the first object group to that of the second object group for the totality of objects to be transported can be determined. This enables different predeterminable mixture ratios in the sequence of the conveyed object groups to the unloading region to be varied and adapted. Thus a few small objects can be conveyed between large objects, which can be used as filler material during stacking.

In order to optimize the buffering of the objects in the two storage regions the first and/or the second storage area can include a number of conveying units disposed one behind the other. Since these conveying units are able to be controlled separately, on one side objects can be conveyed into one storage area for example and simultaneously objects can be conveyed out of the other storage area.

In a further advantageous embodiment the second conveying unit can have a first and a second position, wherein each position is assigned to one of the object groups. This has the advantage that the second conveying unit in the unloading region can be moved into an optimum unloading position for the object group. Thus for example small, light objects can be automatically tipped from above. On the other hand heavy and/or large objects can be manually picked from the second conveying unit and stacked so that the conveying unit for these objects is positioned correspondingly low and ergonomically.

The invention is described below with reference to the form of embodiment shown by way of example in the figures.

DESCRIPTION OF THE INVENTION

Figure 1:
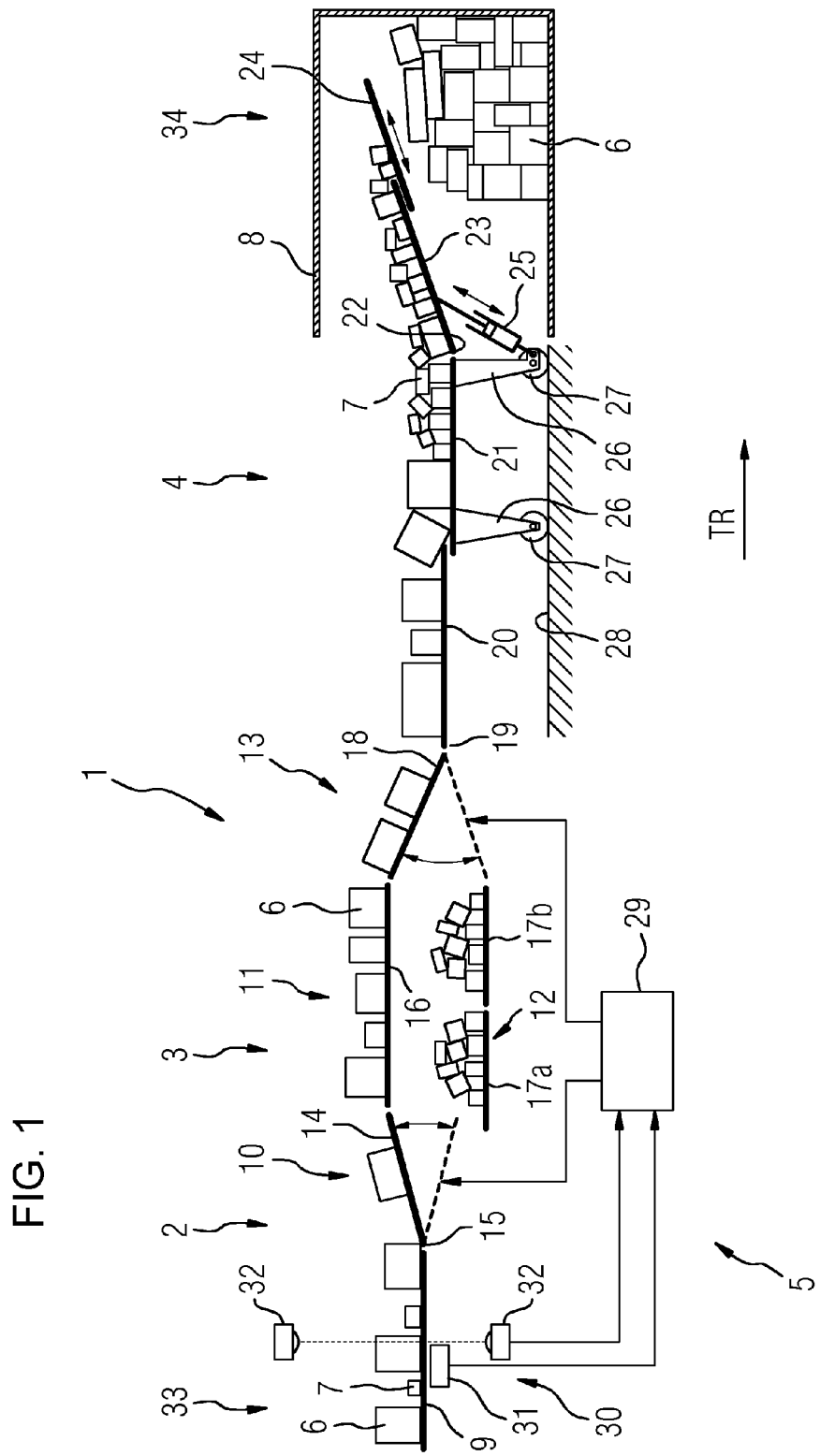
FIG. 1 shows a schematic side view of an exemplary form of embodiment of the inventive transporting device in a first position.

The exemplary form of embodiment of the inventive transporting device 1 is described below with reference to FIGS. 1 and 2.

The transporting device 1 includes a first conveying unit 2, a separating means 3, a second conveying unit 4 and a control device 5.

With the aid of the transporting device 1 objects 6, 7, for example packages, can be conveyed in a transporting direction TR to a transport container 8, for example a swap container, a truck trailer or another transport unit.

Figure 2:
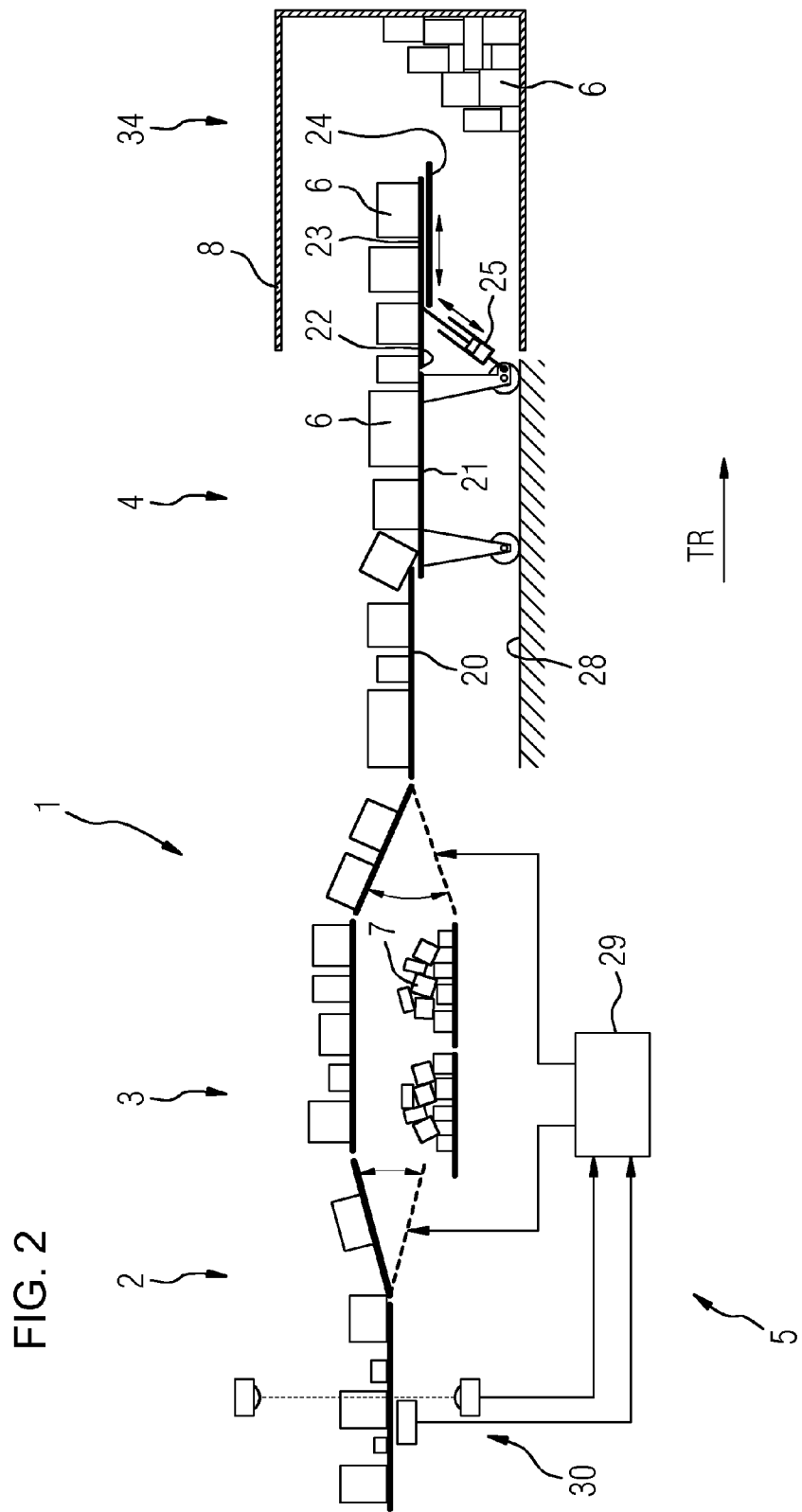
FIG. 2 shows a schematic side view of the inventive form of embodiment according to FIG. 1 in a second position.

In the typical form of embodiment in FIGS. 1 and 2 the first conveying unit 2 includes a horizontally-aligned endless conveyor belt 9. As an alternative the first conveying unit 2 can naturally also have a number of endless conveyor belts disposed one behind the other in the transporting direction TR which are able to be controlled and driven separately. This is not included in the merely schematic diagram of FIGS. 1 and 2. As an alternative to the endless conveyor belts 9 the conveying unit 2 can naturally also have roller tracks or other conveyor means. This alternative also applies for all other endless conveyor belts of the transporting device 1. Objects 6, 7 of different size and weight are disposed one behind the other on the endless conveyor belt 9 in a random distribution.

During operation the endless conveyor belt 9 conveys the objects 6, 7 in the transporting direction TR. The endless conveyor belt 9 is controlled by the control device 5, with which the first conveying unit 2 is connected for signaling purposes.

The separating means 3 is disposed in the transporting direction TR, following on from the first conveying unit 2.

The separating means 3 has an input switch 10, a first storage area 11, a second storage area 12 disposed below the first storage area 11 and an output switch 13.

The input switch 10 in the exemplary form of embodiment of FIGS. 1 and 2 includes an endless conveyor belt 14, which can be varied between an upper position (shown as a solid line) and a lower position (shown as a dashed line). In this case the front end of the endless conveyor belt 14 in the transporting direction TR forms an axis of rotation 15, which runs transverse to the transport direction TR and transverse to the plane of the drawing and about which the endless conveyor belt 14 is able to be pivoted between the upper and the lower position. In this case the axis of rotation 15 is positioned so that the front end of the endless conveyor belt 14 in the vertical direction is flush with the rear end of the vertical conveyor belt 9 of the first conveying units 2. The rear end of the endless conveyor belt 14 in the transporting direction TR is flush in the upper position in the vertical direction approximately with the first storage area 11. In the lower position of the input switch 10 the rear end of the endless conveyor belt 14 is disposed slightly above the second storage area 12 in order if necessary to undertake tipping of small items. As an alternative it can also be flush.

The first storage area 11 includes a horizontally-aligned endless conveyor belt 16. The second storage area 12 includes two endless conveyor belts 17a, 17b in the transporting direction TR, one behind the other, aligned flush with one another. The endless conveyor belts 17a, 17b are disposed in parallel to and in the vertical direction below the endless conveyor belt 16.

The output switch 13, like the input switch 10, is able to be pivoted from an upper position (as shown as a solid line) into a lower position (shown as a dashed line). The output switch 13 likewise has an endless conveyor belt 18. With the output switch 13 the rear end of the endless conveyor belt 18 in the transporting direction TR is fixed as the axis of rotation 19. The endless conveyor belt is disposed so that its rear end is flush with the front end of the second conveying unit 4. The front end of the endless conveyor belt 18 is flush in the upper position of the output switch with the endless conveyor belt 16 of the first storage area. In the lower position of the output switch 13 the front end of the endless conveyor belts 18 is approximately flush with the rear end of the endless conveyor belt 17b of the second storage area 12.

The input switch 10 and the output switch 13 have suitable drives (not shown) to pivot them back and forwards between the upper position and the lower position. These drives for example can be pneumatic cylinders, hydraulic cylinders spindle drives or the like. The input switch 10, the output switch 13 and the storage regions 11, 12 are each connected to the control device for signaling purposes.

In the transporting direction TR the second conveying unit 4 is subsequently connected to the separating means 3. The second conveying unit 4 in the exemplary form of embodiment in FIGS. 1 and 2 essentially includes two horizontally-aligned endless conveyor belts 20, 21 and two endless conveyor belts 23, 24 able to be pivoted around a hinge joint 22. The second conveying unit 4 further includes a pivot drive 25.

The endless conveyor belt 20 is flush with its front end in the transporting direction TR with the rear end of the endless conveyor belt 18 of the output switch 13. The endless conveyor belts 20, 21 are essentially aligned horizontally and disposed in parallel to one another. They are connected to one another so that they are able to be telescoped—i.e. can be pulled apart and pushed together. In the diagrams of FIGS. 1 and 2 the endless conveyor belts 20, 21 are shown in their telescopically extended position. In the retracted position (not shown) the endless conveyor belts 21 can be disposed overlapping more in relation to the endless conveyor belt 20, so that the length of the second conveying unit 4 is shortened in the transporting direction TR. The endless conveyor belt 21 has two supports 26 with wheels 27 which stand on the floor 28, which can be a loading bridge for example. The wheels 27 enable the endless conveyor belts 21 to be moved slightly and thereby extended and retracted. The endless conveyor belt 23 is flush at its front end with the rear end of the endless conveyor belt 21 and is able to be pivoted horizontally and vertically around the pivot joint 22. A first pivot position is shown in FIG. 1, a second pivot position in FIG. 2. The endless conveyor belt 24 is disposed in parallel to the endless conveyor belt 23 and is able to be telescoped in relation to said belt. FIG. 1 shows the endless conveyor belt 24 in an extended position, FIG. 2 shows it in a retracted position.

The control device 5 includes a programmable logic controller 29 and a measuring device 30. The programmable logic controller 29 is connected for signaling purposes to the conveying units 2, 4, the separating means 3 and the measuring device 30 and controls these devices during operation.

The measuring device 30 includes a weighing unit 31 and a size measuring unit 32, which have light barriers for example.

The function of the inventive transporting device 1 in operation is described below.

The transporting device 1 conveys objects 6, 7 of different size and/or weight from a loading region 33, in which the objects 6, 7 are loaded onto the transporting device 1, to an unloading region 34. In the unloading region 34 the objects 6, 7 are picked from the transporting device 1, which can be done manually or automatically, e.g. by tipping.

In the loading region 33 a random mix of large and/or heavy objects 6 and light objects 7 come onto the first conveying unit 2 one behind the other. This can be done for example by an upstream sorting machine, which allocates all objects 6, 7 for the transport container 8 to the transporting device 1. The endless conveyor belt 9 of the first conveying unit 2 conveys the objects 6, 7 onwards in the transporting direction TR. During this process the measuring device 30 determines at least one object property for each object 6, 7. An object property here is the external dimension or the volume of each object 6, 7. A further object property is the weight. The external dimensions of the objects 6, 7 are detected by the size measuring unit 32, for example two light barriers or cameras. The weighing unit 31 establishes the weight of each object 6, 7. Other object properties can of course also be established.

The establish object properties are passed on by the measuring device 30 to the control 29, wherein one object property is already sufficient.

With the object property(s) the control 29 allocates each object 6, 7 to one of two object groups. In the exemplary form of embodiment in FIGS. 1 and 2 a first object group forms the large and/or heavy objects 6. A second object group forms all other objects, i.e. the small and light objects 7. A corresponding threshold value for the size and/or the weight is stored in the control 29 so that the control 29 can assign each object 6, 7 to a group. As an alternative more than two object groups can also be separated.

The first conveying unit 2 subsequently conveys the objects 6, 7 to the separating means 3 and indeed initially to the input switch 10. The control 29 controls the endless conveyor belt 9 and the endless conveyor belt 14 so that in each case only one object 6, 7 is located on the input switch 10. The position of the objects 6, 7 can be monitored by light barriers (not shown). Depending on the assignment of the first or second object group the input switch 10 will be brought by the control 29 into its first, upper position or into its second, lower position, so that the object 6, 7 can be conveyed into the first or second storage area 11, 12. In the diagram shown in FIGS. 1 and 2 large and/or heavy objects 6 are conveyed via the upper position of the input switch 10 into the first storage area 11. Accordingly small, light objects 7 are conveyed via the lower setting of the input switch 10 into the second storage area 12. Since the small, light objects 7 can be tipped, the endless conveyor belt 14 is located in the lower position above the endless conveyor belt 17a. Thus the small, light objects 7 are shaken onto the endless conveyor belt 17a and form a space-saving pile or "Bulk". Thus many small, light objects 7 can be accepted. Separate piles can be formed on each endless conveyor belt 17a, 17b. The endless conveyor belts 17a, 17b are separately driven and controlled in such cases.

From the storage regions 11, 12 the objects 6, 7 are conveyed via the output switch 13 and the second conveying unit 4 to the unloading region 34. However the objects 6, 7 are now divided into the object groups and are conveyed one behind the other, grouped into the object groups, on the second conveying unit 4 to the unloading region 34.

In such cases the second conveying unit 4, according to the object group just conveyed, can be bought into a suitable position. In the position in FIG. 2 only large and/or heavy objects 6 are conveyed to the unloading region 34. For this the endless conveyor belt 24 is retracted and together with the endless conveyor belt 23 in a lower position. This position of the second conveying unit 4 is suitable for enabling a worker to easily pick the large and/or heavy objects 6 manually from the transporting device 1 and stack them in the transport container 8. Here the conveying unit 4 can be moved as closely as possible and adapted in height into the area of the transport container 8 into which the worker is stacking the objects 6. Thus ergonomic and low-stress working is made possible. In this case the endless conveyor belts 23, 24 can be pivoted both horizontally and also vertically.

In FIG. 1, unlike in FIG. 2, small, light objects 7 are conveyed into the unloading region 34. For this the second conveying unit 4 is in an upper extended position in which the endless conveyor belt 24 is extended and is pivoted upward with the endless conveyor belt 23. In this position the many small, light objects 7 can be tipped onto the stack of large and/or heavy objects 6 which are already stacked in the transport container 8. This is especially time-saving and simple for the operator.

The invention claimed is:

1. A transporting device for transporting objects in a transport direction from a loading region to an unloading region, the transporting device comprising:

a first conveying unit and a second conveying unit disposed one behind another in the transport direction; and a separating device disposed between said first conveying unit and said second conveying unit, said separating device being configured for separating the objects into at least two object groups in dependence on at least one object property;

said separating including an input switch disposed in the transport direction behind said first conveying unit and an output switch disposed in the transport direction before said second conveying unit and configured to assume a first position and a second position, and wherein, in the first position of said output switch, the objects of the first object group are conveyed to the second conveying unit and, in the second position of the output switch, the objects of the second object group are conveyed to the second conveying unit.

2. The transporting device according to claim 1, wherein said separating device includes an input switch disposed in the transport direction behind said first conveying unit and configured to assume a first position and a second position, and wherein, in operation, the objects are separated into the first object group in the first position of said input switch and into the second object group in the second position of said input switch.

3. The transporting device according to claim 1, which comprises at least two storage regions each assigned to a respective object group, and into which the objects are to be separated.

4. The transporting device according to claim 3, wherein said storage regions are disposed vertically above one another.

5. The transporting device according to claim 1, which comprises at least two storage regions each assigned to a respective object group, and into which the objects are to be separated, and wherein the input switch and/or the output switch and/or the first and second storage regions are mutually separate conveying units configured for transporting the objects in the transport direction.

6. The transporting device according to claim 3, wherein one or both of said first and second storage areas include a plurality of conveying units disposed one behind another.

7. The transporting device according to claim 1, which further comprises a control device configured for controlling said conveying units and said separating device.

8. The transporting device according to claim 7, wherein said control device includes a measuring device configured for detecting the at least one object property, and wherein said control device controls said separating device as a function of the at least one object property.

9. The transporting device according to claim 7, wherein said control device includes a counting device for counting a number of objects of the first and second object groups, and wherein said control device controls the separating device as a function of the counts.

10. The transporting device according to claim 1, wherein said second conveying unit is configured to assume a first position and a second position, and wherein each said position is assigned to a respective one of the object groups.

11. A method for transporting objects along a transport direction from a loading region into an unloading region, the method comprising:
providing a first conveying unit, a second conveying unit, and a separating device with an input switch disposed in a transport direction behind said first conveying unit and output switch disposed in the transport direction before the second conveying unit;
while conveying the objects from the loading region to the unloading region, separating the objects with the separating device, in dependence on at least one object property, into at least two object groups including a first object group and a second object group; and
subsequently, first conveying the objects of the first object group and then conveying the objects of the second object group to the unloading region, by causing the output switch to selectively assume a first position wherein the objects of the first object group are conveyed to the second conveying unit and a second position wherein the objects of the second object group are conveyed to the second conveying unit.

* * * * *